(12) United States Patent
Takahashi

(10) Patent No.: US 9,678,288 B2
(45) Date of Patent: Jun. 13, 2017

(54) OPTICAL CIRCUIT

(71) Applicant: Photonics Electronics Technology Research Association, Tokyo (JP)

(72) Inventor: Shigeki Takahashi, Tokyo (JP)

(73) Assignee: PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 14/904,038

(22) PCT Filed: Jul. 9, 2014

(86) PCT No.: PCT/JP2014/068260
§ 371 (c)(1),
(2) Date: Jan. 8, 2016

(87) PCT Pub. No.: WO2015/005368
PCT Pub. Date: Jan. 15, 2015

(65) Prior Publication Data
US 2016/0170157 A1     Jun. 16, 2016

(30) Foreign Application Priority Data

Jul. 10, 2013   (JP) .................................. 2013-144409

(51) Int. Cl.
*G02B 6/42* (2006.01)
*G02B 6/122* (2006.01)
(Continued)

(52) U.S. Cl.
CPC ........... *G02B 6/4209* (2013.01); *G02B 6/122* (2013.01); *G02B 6/1228* (2013.01);
(Continued)

(58) Field of Classification Search
CPC .................................. G02B 6/42; G02B 6/122
(Continued)

(56) References Cited

U.S. PATENT DOCUMENTS 5,313,266 A * 5/1994 Keolian et al. ............... 356/477
5,469,257 A * 11/1995 Blake et al. ................... 356/464
(Continued)

FOREIGN PATENT DOCUMENTS

CN     102279441 A    12/2011
JP     H09-073021 A    3/1997
(Continued)

OTHER PUBLICATIONS

International Search Report issued in Application No. PCT/JP2014/068260, mailed Oct. 7, 2014.

*Primary Examiner* — Kaveh C Kianni
(74) *Attorney, Agent, or Firm* — Michael Best & Friedrich LLP

(57) ABSTRACT

A low-cost optical circuit, in which influence of reflected light is reduced, is provided. According to an embodiment of the present invention, an optical circuit (200) comprises a first optical coupler (204A) having at least two outputs, and a second optical coupler (204B) coupled to at least one of the outputs of the first optical coupler (204A), and wherein the ratio of an intensity of light reflected from the first optical coupler (204A) to an intensity of light inputted to the first optical coupler is smaller than the ratio of an intensity of light reflected from the second optical coupler (204B) to an intensity of light inputted to the second optical coupler.

10 Claims, 12 Drawing Sheets

(51) Int. Cl.
*G02B 6/293* (2006.01)
*G02B 6/28* (2006.01)
*G02B 6/12* (2006.01)

(52) U.S. Cl.
CPC ........ *G02B 6/29344* (2013.01); *G02B 6/2804* (2013.01); *G02B 2006/12121* (2013.01)

(58) Field of Classification Search
USPC .......................................................... 385/14
See application file for complete search history.

(56) References Cited

U.S. PATENT DOCUMENTS

| | | | |
|---|---|---|---|
| 6,339,474 B2 * | 1/2002 | Paiam et al. | 356/480 |
| 6,359,728 B1 * | 3/2002 | Angellieri et al. | 398/92 |
| 2002/0080832 A1 * | 6/2002 | Chang et al. | 372/6 |
| 2003/0235367 A1 * | 12/2003 | Yamazaki | 385/39 |
| 2004/0067022 A1 * | 4/2004 | Chen et al. | 385/42 |
| 2006/0109477 A1 * | 5/2006 | Zhou et al. | 356/479 |
| 2011/0110624 A1 * | 5/2011 | Kamei et al. | 385/24 |
| 2011/0129236 A1 | 6/2011 | Jeong | |
| 2012/0002921 A1 * | 1/2012 | Jeong | 385/32 |
| 2012/0243827 A1 * | 9/2012 | Jeong | 385/24 |
| 2013/0136393 A1 | 5/2013 | Ishii et al. | |
| 2013/0322809 A1 * | 12/2013 | Goh et al. | 385/3 |

FOREIGN PATENT DOCUMENTS

| | | |
|---|---|---|
| JP | 2003-029069 A | 1/2003 |
| JP | 2004-037769 A | 2/2004 |
| JP | 2005-062756 A | 3/2005 |
| JP | 2005-202241 A | 7/2005 |
| JP | 2006-047737 A | 2/2006 |
| JP | 2010-271741 A | 12/2010 |
| JP | 2011-118055 A | 6/2011 |
| JP | 2011-237693 A | 11/2011 |
| JP | 2012-013886 A | 1/2012 |
| JP | 2012-027211 A | 2/2012 |
| JP | 2012-203173 A | 10/2012 |
| WO | WO-2012/017644 A1 | 2/2012 |
| WO | WO-2013/133099 A1 | 9/2013 |

* cited by examiner

OPTICAL CIRCUIT

TECHNICAL FIELD

The present invention relates to an optical circuit, specifically, an optical circuit in which effect of reflected light is reduced.

BACKGROUND ART

In an optical communication system, it is required to stabilize an operation of a light source, such as a semiconductor laser and so on. For example, in an optical integrated circuit used as an optical transmitting/receiving module, in the case that an optical coupler is coupled to a light source, reflected light is generated at the optical coupler. If the reflected light is inputted to the light source, the operation of the light source will become unstable.

Thus, in a prior-art technique, an optical isolator is placed outside an optical integrated circuit chip. Patent-related Document 1 describes that, when placing a PLC (Planar Lightwave Circuit) and a bulk optical component, or placing two PLCs, with a certain distance therebetween when constructing a spatial optical system in an optical signal processing device, it is necessary to insert an optical isolator between the PLCs for preventing change of device characteristics due to reflected light returning to an output-end surface of the PLC.

Also, in a prior-art technique, an optical input/output end surface of an optical integrated circuit chip is set to have a slope with respect to a surface vertical to the direction of propagation of light. Patent-related Document 2 describes an optical element chip in which a PLC waveguide and an LN (lithium niobate) waveguide are optically coupled, wherein the connecting surface of the PLC waveguide and the LN waveguide is set to have a slope with respect to an optical axis.

Patent-related Document 3 describes a technique to place an optical isolator in an optical transmission module, and a technique to set a plane of incidence from a laser light source to an optical member to be slanted with respect to an optical axis.

However, the above constructions result in increase of costs and increase of optical loss.

CITATION LIST

Patent-Related Documents

Patent-related Document 1: Japanese Patent Application Public Disclosure No. 2010-271741
Patent-related Document 2: PCT pamphlet No. WO 2012/017644
Patent-related Document 3: Japanese Patent Application Public Disclosure No. 2011-237693

SUMMARY OF INVENTION

Technical Problem

The present invention provides a low-cost optical circuit that reduces effect of reflected light.

Solution to Problem

In an embodiment of the present invention, an optical circuit comprises:

a first optical coupler comprising at least two outputs; and
a second optical coupler coupled to at least one of the outputs of the first optical coupler;
wherein a ratio of intensity of light reflected from the first optical coupler to intensity of light inputted to the first optical coupler is smaller than a ratio of intensity of light reflected from the second optical coupler to intensity of light inputted to the second optical coupler.

In the embodiment of the present invention, the first optical coupler and the second optical coupler are coupled via an optical waveguide, and the ratio $R_1$ of the intensity of the light reflected from the first optical coupler to the intensity of the light inputted to the first optical coupler, optical loss $\alpha_1$ of the first optical coupler, branching loss $\beta_1$ of the first optical coupler, the ratio $R_2$ of the intensity of the light reflected from the second optical coupler to the intensity of the light inputted to the second optical coupler, and propagation loss $\gamma$ of the optical waveguide satisfy the following relationship: $(R_2-R_1) \leq 2(\alpha_1+\beta_1+\gamma)$.

In the embodiment of the present invention, the first optical coupler and the second optical coupler are MMI couplers.

In the embodiment of the present invention, the width of the MMI coupler that constitutes the first optical coupler is smaller than the width of the MMI coupler that constitutes the second optical coupler.

In the embodiment of the present invention, the first optical coupler is a directional coupler.

In the embodiment of the present invention, the second optical coupler comprises plural outputs.

In the embodiment of the present invention, the optical circuit further comprises a laser light source coupled to an input of the first optical coupler; and optical path length "a" between the laser light source and the first optical coupler satisfies the following relationship $$a \leq \frac{\lambda^2}{2n_{eff}w} \quad \text{[Formula 1]}$$

wherein $\lambda$ is a wavelength of light in a vacuum, $n_{eff}$ is an effective refractive index of the waveguide that couples the laser light source and the first optical coupler, and w is spectral line width of the laser light source.

In the embodiment of the present invention, the optical circuit further comprises a laser light source coupled to an input of the first optical coupler, the light source comprises at least a first laser channel and a second laser channel, the first optical coupler comprises at least a first input and a second input, the first laser channel and the second laser channel are coupled to the first input and the second input, respectively, and one of the first input and the second input is used as a main input and the other is used as a reserve input.

In the embodiment of the present invention, the shape of the first optical coupler is asymmetric with respect to a center line between the first input and the second input.

In the embodiment of the present invention, the first optical coupler is an MMI coupler; the first input and the second input have tapered shapes; and width of the taper of the input used as a main input is larger than width of the taper of the input used as a reserve input.

DESCRIPTION OF EMBODIMENTS

Embodiments of the present invention will be explained below in detail with reference to the figures.

Figure 1:
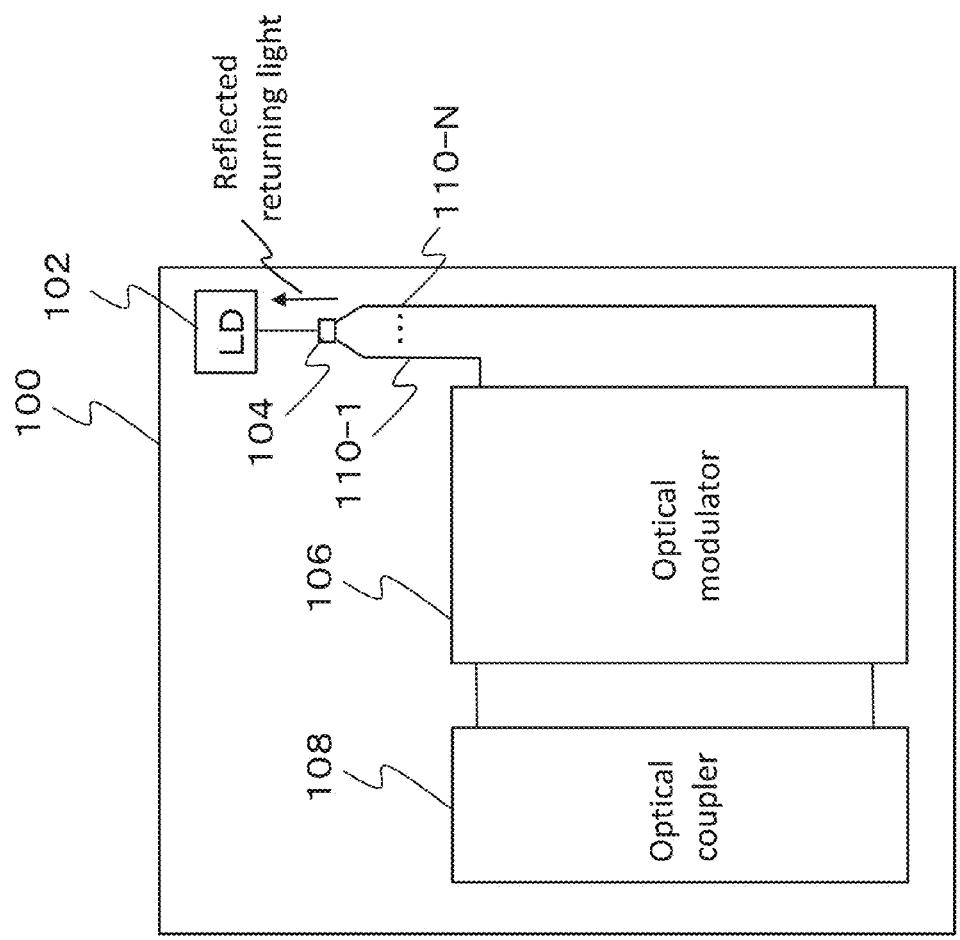
FIG. 1 is a schematic drawing of an example optical integrated circuit.

FIG. 1 shows a schematic drawing of an example optical integrated circuit 100. The optical integrated circuit 100 is used, for example, as an optical transmission module. The optical integrated circuit 100 comprises a light source 102 such as a semiconductor laser, an optical branching part 104, an optical modulator 106, an optical coupler 108, and optical waveguides 110-1 to 110-$n$. The light outputted from the light source 102 is divided by the optical branching part 104 to be inputted to n optical waveguides 110-1 to 110-$n$ to thereby propagate therethrough. The optical waveguides 110-1 to 110-$n$ are coupled to the optical modulator 106. The optical modulator 106 modulates the respective parts of the light transmitted through the respective waveguides, and outputs optical signals. The optical signals are coupled by the optical coupler 108 to optical transmission paths (not shown), and transmitted through the optical transmission paths.

As shown in FIG. 1, a part of the light outputted from the light source 102 is reflected by the optical branching part 104. If the reflected returning light is inputted to the light source 102, the operation of the light source will become unstable. FIG. 1 shows a single optical branching part 104. However, depending on a construction of an optical integrated circuit, plural optical branching parts may be coupled. In such a case, reflected returning light from each of the coupled optical branching parts has effect on the light source.

Figure 2:
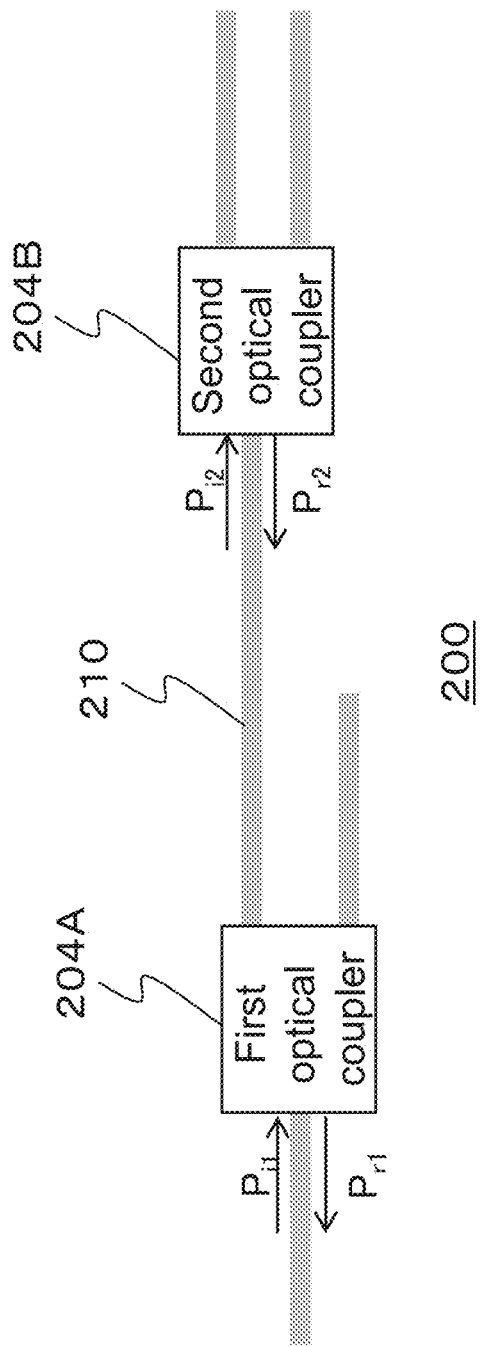
FIG. 2 is a schematic drawing of an example optical circuit according to an embodiment of the present invention.

FIG. 2 shows a schematic drawing of an example optical circuit 200 according to an embodiment of the present invention. The optical circuit 200 may be used, for example, in an optical integrated circuit. The optical circuit 200 comprises a first optical coupler 204A and a second optical coupler 204B. The first optical coupler 204A and the second optical coupler 204B are coupled via an optical waveguide 210. An input of the first optical coupler 204A is connected to a light source (not shown) such as a semiconductor laser.

In FIG. 2, each of the first optical coupler 204A and the second optical coupler 204B comprises one input and two outputs; and one of the outputs of the first optical coupler 204A is connected to the input of the second optical coupler 204B. However, the construction of the optical circuit 200 is not limited to that shown in FIG. 2. Each of the first optical coupler 204A and the second optical coupler 204B may comprise any number of inputs and any number of outputs. The optical circuit 200 may be constructed in such a manner that at least one of outputs of the first optical coupler 204A is connected to at least one of inputs of the second optical coupler 204B. For example, the first optical coupler 204A may comprise two outputs and the second optical coupler 204B may comprise two inputs, and the two outputs of first optical coupler 204A may be connected to the two inputs of the second optical coupler 204B, respectively.

As shown in FIG. 2, it is supposed that the intensity of the light reflected from the first optical coupler 204A is $P_{r1}$ in the case that the intensity of the light inputted to the first optical coupler 204A is $P_{i1}$, and that the intensity of the light reflected from the second optical coupler 204B is $P_{r2}$ in the case that the intensity of the light inputted to the second optical coupler 204B is $P_{i2}$. Then, the ratio $R_1$ of the intensity of the reflected light to the intensity of the inputted light with respect to the first optical coupler 204A (hereinafter, "reflected-light intensity ratio") is represented as $R_1=10\times\log_{10}(P_{r1}/P_{i1})$, and the reflected-light intensity ratio $R_2$ of the intensity of the reflected light to the intensity of the inputted light with respect to the second optical coupler 204B is represented as $R_2=10\times\log_{10}(P_{r2}/P_{i2})$.

If all of the connected optical couplers are constructed to have small reflected-light intensity ratios, effect of reflected light on the light source will be reduced. However, if an optical coupler is constructed to have a small reflected-light intensity ratio, optical loss of the optical coupler may be increased, and tolerance regarding manufacture errors may be lowered (i.e., when a manufacture error has occurred, the values of optical loss and/or branching ratio tend to deviate from their designed values). Thus, if the reflected-light intensity ratio of the optical coupler is made to be small, the performance of the optical circuit may largely deviate from its designed values.

In an embodiment of the present invention, the optical circuit 200 is constructed to have the following relationship $R_1<R_2$. For example, the optical circuit 200 is constructed in such a manner that the first optical coupler 204A has a reflected-light intensity ratio smaller than a usual reflected-light intensity ratio, and the second optical coupler 204B has a usual reflected-light intensity ratio. According to the present embodiment, since the reflected-light intensity ratio of the first optical coupler 204A is small, effect of the reflected returning light on the light source can be suppressed. Also, since it is not required to design the second optical coupler 204B to have small reflected-light intensity ratio beyond necessity, possibility that the characteristics (optical loss, a branching ratio, and so on) of the second optical coupler deviate from their designed values can be lowered. Thus, according to the present embodiment, tolerance regarding manufacture errors of the second optical coupler 204B will be increased. Consequently, according to the present embodiment, the reflected returning light directed toward the light source is reduced, and bad influence such as increase of optical loss, deviating of the branching ratio from its designed value, and so on, can be suppressed.

The first optical coupler 204A and the second optical coupler 204B may comprise a variety of optical couplers, for example, multimode waveguides (multimode interferometers) such as MMI couplers and Y-branching parts, directional couplers, and so on. In an example, the first optical coupler 204A and the second optical coupler 204B may comprise MMI couplers, respectively. In another example, the first optical coupler 204A may comprise a directional coupler, and the second optical coupler 204B may comprise a multimode waveguide such as an MMI coupler. Further, a variety of combinations of optical couplers may be used in the present embodiment.

Examples of the types of optical couplers used in the present embodiment, the ratios of intensity of light reflected from the optical couplers to the intensity of light inputted to the optical couplers (reflected-light intensity ratios), and manufacture tolerance are shown in Table 1.

TABLE 1

| Types of optical couplers | Reflected-light intensity ratios (dB) | Manufacture tolerance (nm) |
|---|---|---|
| MMI (width: 6.0 μm) | −31.6 | 168 |
| MMI (width: 4.6 μm) | −34.5 | 106 |
| MMI (width: 2.8 μm) | −44.2 | 67 |
| Directional coupler | −53.7 | 3 |

This example considers an optical integrated circuit that is formed by stacking, on a silicon (Si) substrate, a buried oxide film (BOX), a Si thin-line waveguide, and an upper cladding layer. The MMI coupler and the directional coupler are based on Si thin-line waveguides on such an SOI substrate. Material of the upper cladding layer comprises $SiO_2$: and MMIs have the following sizes, respectively; the width of 6.0 μm and the length of 150 μm, the width of 4.6 μm and the length of 88 μm, and the width of 2.8 μm and the length of 34 μm. The gap between the waveguides of the directional coupler is 0.4 μm, and the length of the directional coupler is 49.5 μm.

Figure 3:
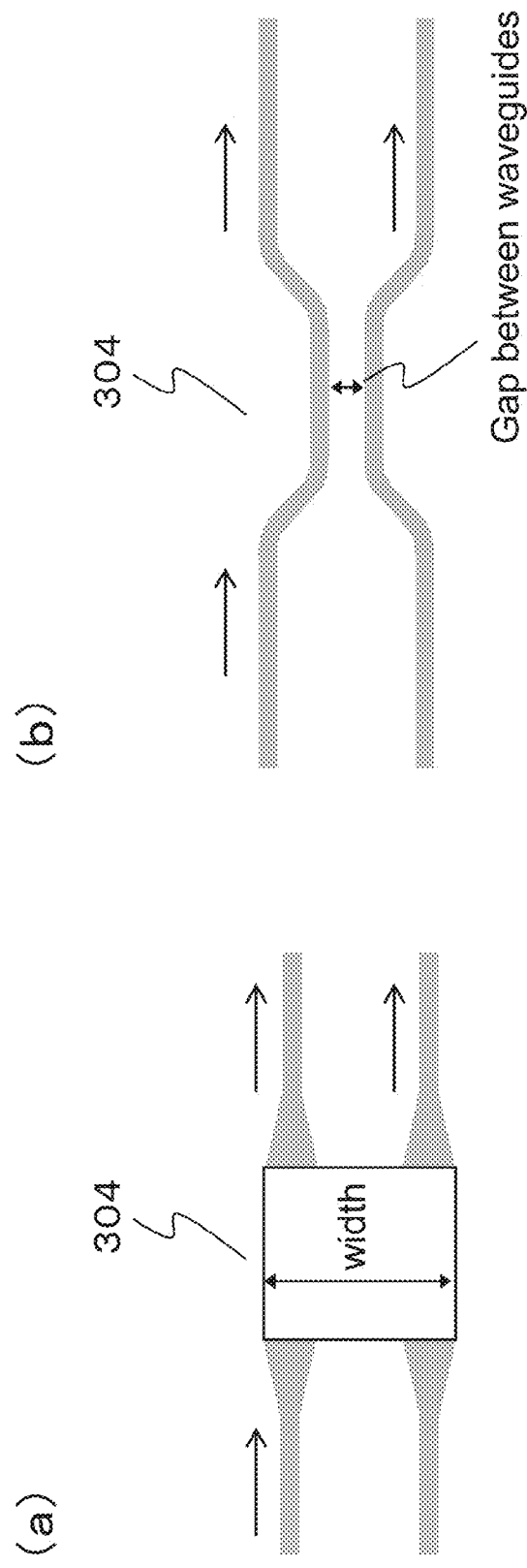
FIG. 3 is a drawing showing an example construction of an optical coupler.

The manufacture tolerance is an allowable value of a manufacture error that is set for suppressing the power loss, that is due to deviating of values of the optical loss and branching ratio of the optical coupler from designed values thereof, to be equal to or less than 10% of the designed value. (a) and (b) of FIG. 3 show examples of constructions of an MMI coupler and a directional coupler, respectively. The "width" shown in (a) of FIG. 3 corresponds to the "width" of an MMI described in Table 1.

Figure 4:
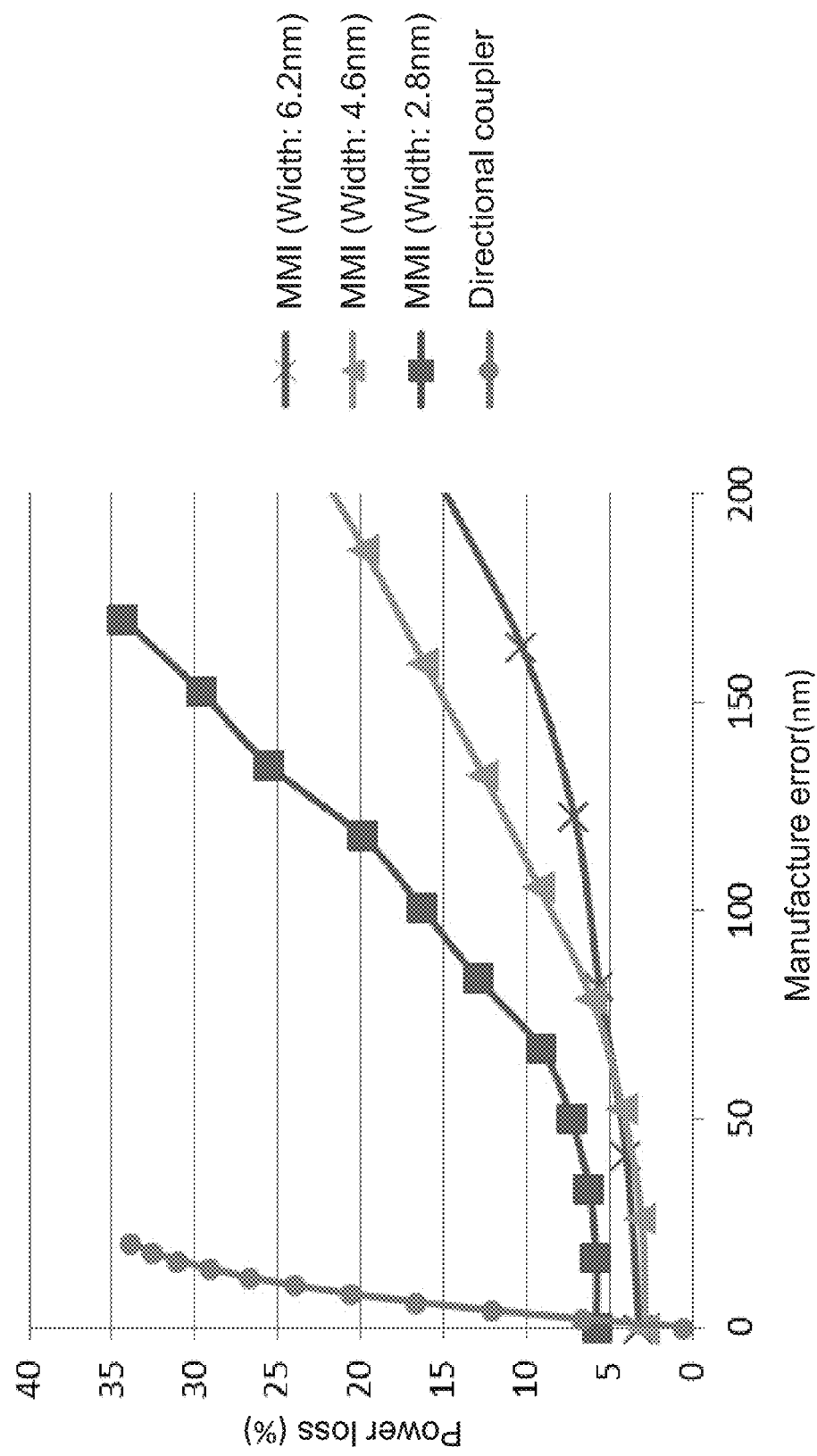
FIG. 4 is a graph showing manufacture error dependency of power loss calculated for each of couplers shown in Table 1.

FIG. 4 is a graph showing manufacture error dependency of power loss calculated for each of couplers shown in Table 1. In FIG. 4, for the MMI couplers, the horizontal axis represents the error of the width of the MMIs; and, for the directional coupler, the horizontal axis represents the error of the distance between two waveguides that constitute the directional coupler.

As shown in Table 1, in the case of an MMI coupler, the reflected-light intensity ratio can be lowered by reducing the width of the MMI. However, as can be understood from FIG. 4, the power loss is sensitive to the manufacture error of the width of the MMI; that is, the range of the manufacture tolerance will be narrowed in exchange for reduction of the width of the MMI. In this example, the MMI coupler having two inputs and two outputs and having the branching ratio of 1:1 was studied; however, other MMI couplers also have characteristics similar to those described above.

As shown in Table 1, in the case of a directional coupler, the reflected-light intensity ratio can be further lowered compared with that of an MMI coupler. However, as can be understood from FIG. 4, the power loss is very sensitive to the error of the distance between waveguides that constitute the directional coupler; that is, the range of the manufacture tolerance will be further narrowed than that of the MMI.

In an embodiment in which the first optical coupler and the second optical coupler are MMI couplers, the first optical coupler may be constructed to have a size smaller than that of the second optical coupler. Also, in the case that the first optical coupler and the second optical coupler have tapered input parts, the input part of the first optical coupler may be constructed to have a taper width smaller than that of the second optical coupler.

The reflected-light intensity ratio of the first optical coupler is not necessarily set to be as low as that of a conventional optical isolator. For example, the reflected-light intensity ratio $R_1$ of the first optical coupler may be in the range of −35 dB to −40 dB.

Figure 5:
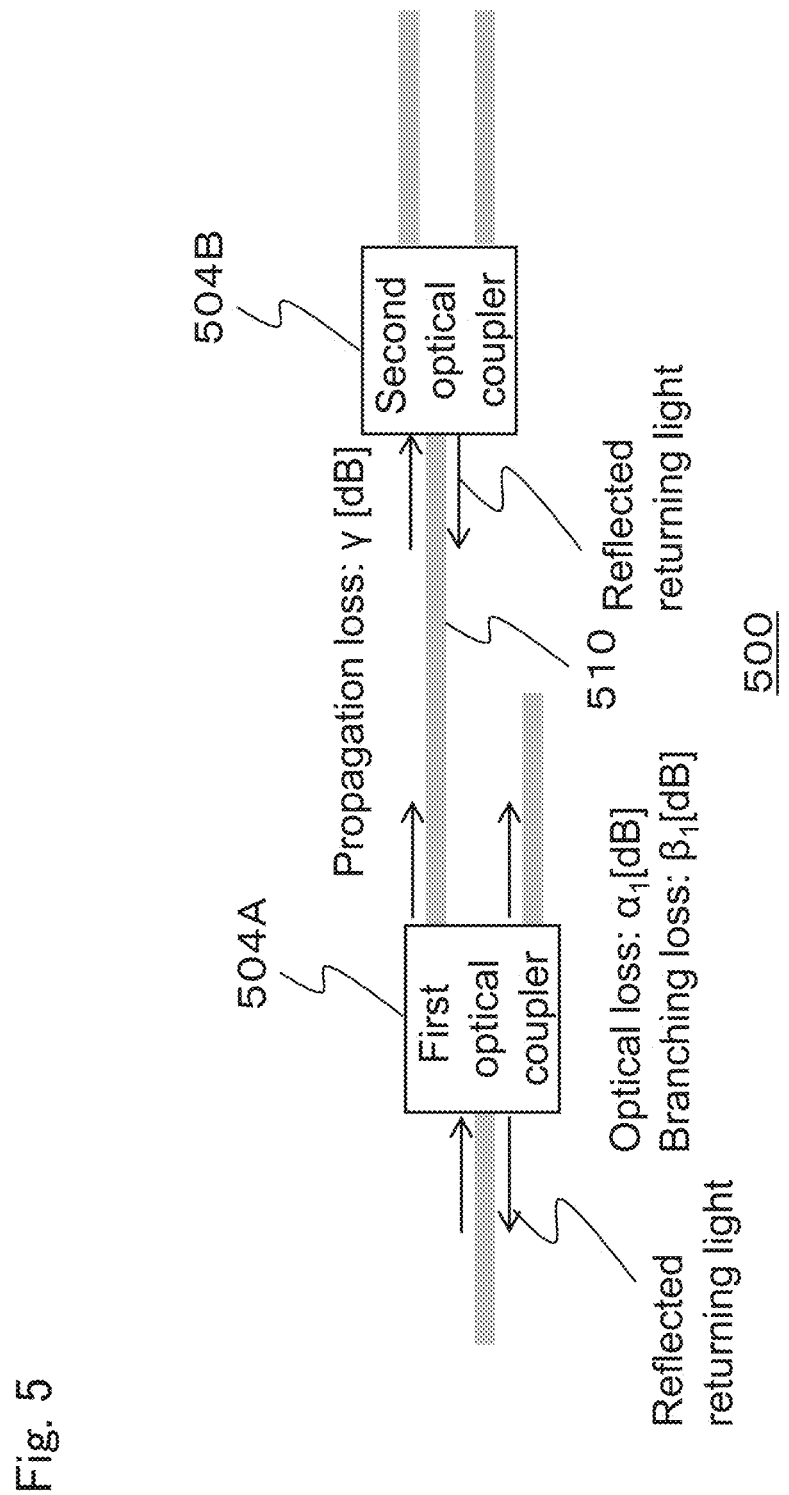
FIG. 5 is a schematic drawing of an example optical circuit according to an embodiment of the present invention.

FIG. 5 shows a schematic drawing of an example optical circuit 500 according to an embodiment of the present invention. The optical circuit 500 comprises a first optical coupler 504A and a second optical coupler 504B. The first optical coupler 504A divides inputted light and directs the divided parts of the light to at least two output optical channels. At least one of the output optical channels of the first optical coupler 504A is inputted to the second optical coupler 504B via an optical waveguide 510.

Similar to the case of FIG. 2, the optical circuit 500 is constructed in such a manner that the ratio $R_1$ of the intensity of the reflected light to the intensity of the inputted light (the reflected-light intensity ratio) with respect to the first optical coupler 504A and the reflected-light intensity ratio $R_2$ with respect to the second optical coupler 504B satisfy the following condition $R_1 < R_2$. As explained above, the optical circuit 500 can reduce the effect of the light reflected and returned by the first optical coupler 504A and the second optical coupler 504B. However, if $R_1$ is lowered, $R_2$ may be increased in a relative manner; and, the effect of the light reflected and returned by the second optical coupler 504B may become large in a relative manner.

In the present embodiment, in addition to satisfying the condition $R_1 < R_2$, the optical circuit 500 is constructed in such a manner that $R_1$, $R_2$, optical loss $\alpha_1$ (dB) and branching loss $\beta_1$ (dB) of the first optical coupler 504A, and propagation loss $\gamma$ (dB) of the optical waveguide satisfy the following relationship:

[Formula 2]

$$(R_2 - R_1) \leq 2(\alpha_1 + \beta_1 + \gamma) \quad \text{(Equation 1)}$$

If the optical circuit 500 is constructed to satisfy Equation 1, the problem such that the effect of the reflected light generated at the second optical coupler 504B becomes dominant can be avoided. The reflected light generated at the first optical coupler 504A and inputted to a light source (not shown) becomes larger than the reflected light generated at the second optical coupler 504B and inputted to the light source. Thus, the effect of the reflected light from the first optical coupler 504A becomes dominant, and the effect of the reflected light from the second optical coupler 504B can be suppressed to be small.

If the reflected-light intensity ratio $R_1$ of the first optical coupler 504A is lowered to have a value that does not satisfy Equation 1, the effect of the reflected light from the second optical coupler 504B becomes dominant; thus, even if the reflected-light intensity ratio of the first optical coupler 504A is made to be small, sufficient effect cannot be obtained therefrom. Also, if the reflected-light intensity ratio of the first optical coupler 504A is made to be small, tolerance for manufacture error of the first optical coupler 504A is lowered. Thus, in the case that the reflected-light intensity ratio of the first optical coupler 504A is simply lowered, it may not be able to obtain sufficient effect; that is, there may be risks such that the optical loss of the first optical coupler 504A increases, the branching ratio deviates from its designed value, and so on.

According to the present embodiment, the first optical coupler 504A and the second optical coupler 504B are constructed to satisfy Equation 1; and, while obtaining effect to reduce the reflected light from the first optical coupler 504A, large degradation of optical characteristics of the first optical coupler 504A can be avoided.

In the case that the optical circuit is designed to satisfy Equation 1, there is a possibility such that the difference between the reflected-light intensity ratio of the first optical coupler 504A and the reflected-light intensity ratio of the second optical coupler 504B cannot be set to be very large. In such a case, it is required to design the second optical coupler 504B to have a relatively low reflected-light intensity ratio; then, tolerance for manufacture error of the second optical coupler 504B is lowered. In the embodiment, for avoiding the matters described above, the propagation loss γ (dB) of the optical waveguide 510 may be intentionally set to be large. For example, it may be possible to intentionally design the length of the optical waveguide 510 to be extended, or the width of the optical waveguide 510 to be changed to intentionally increase the propagation loss. As a result thereof, the degree of freedom of design of the second optical coupler can be increased, and tolerance for manufacture error can be made to be large, since it is not necessary to greatly reduce the reflected-light intensity ratio of the second optical coupler 504B.

Note that the optical waveguide 510 may comprise a variety of waveguides such as a bended waveguide, a phase adjusting waveguide for adjusting the phase of propagating light, an intensity adjusting waveguide for adjusting the intensity of propagating light, and so on; and all of the optical loss of these waveguides is included in the propagation loss γ (dB) of the optical waveguide 510.

Figure 6:
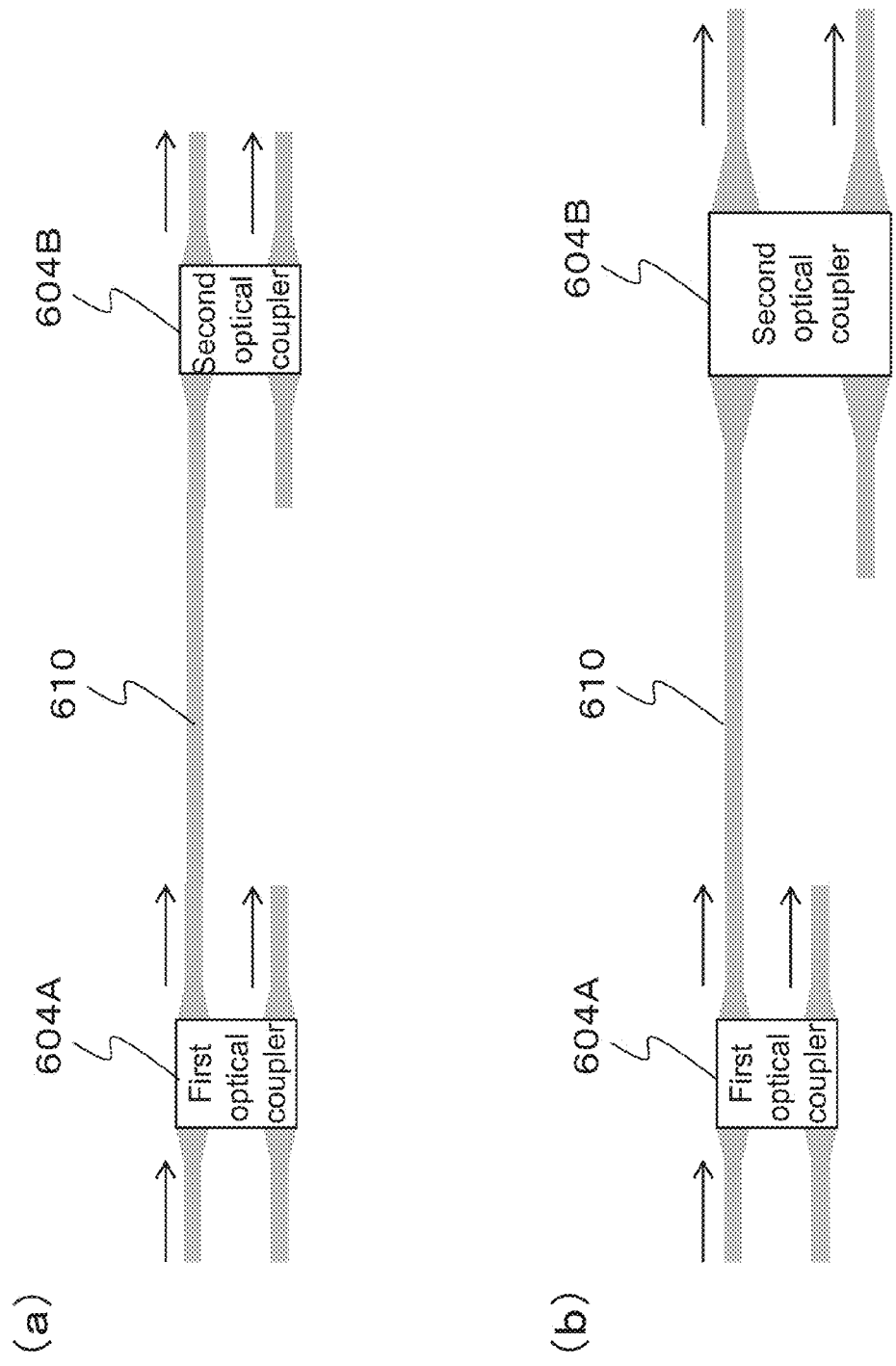
FIG. 6 comprises schematic drawings of a prior-art optical circuit and an example optical circuit according to an embodiment of the present invention.

FIG. 6 shows a prior-art optical circuit (a) that uses, as a first optical coupler 604A and a second optical coupler 604B, MMI couplers having the same construction; and an example optical circuit (b) according to an embodiment of the present invention.

As a tangible example, it is supposed that the required specification of the ratio of intensity of reflected light to intensity of inputted light at a point where light is inputted to the first optical coupler 604A is equal to or less than −40 dB. For realizing the above required specification by use of the prior-art optical circuit (a), it is required to use, for example, the MMI coupler having width of 2.8 μm, that is shown in Table 1, as each of the first optical coupler 604A and the second optical coupler 604B. On the other hand, in the optical circuit (b) of the embodiment of the present invention, it is not required to use two same MMI couplers. For example, the MMI coupler having width of 2.8 μm and the MMI coupler having width of 4.6 μm, that are shown in Table 1, can be used as the first optical coupler 604A and the second optical coupler 604B, respectively.

Figure 7:
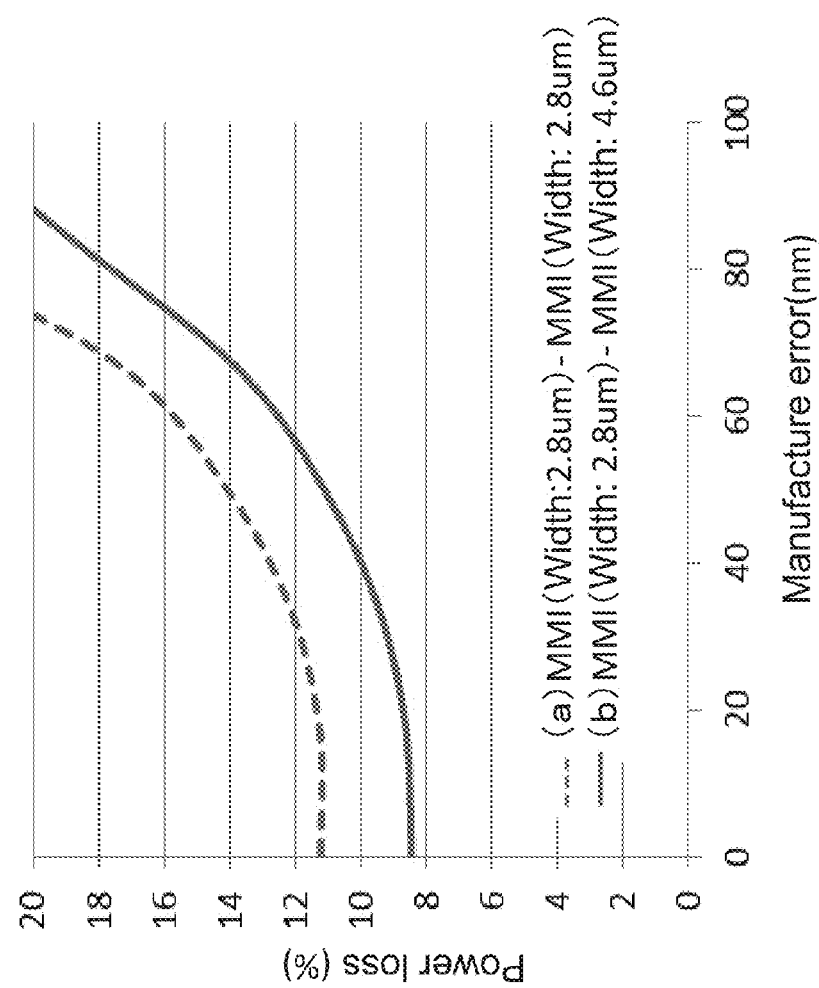
FIG. 7 is a graph showing results of calculation of relationships between manufacture errors and power loss regarding the optical circuits shown in FIG. 6.

FIG. 7 shows results of calculation of relationships between manufacture error and poser loss with respect to the optical circuit (a) and the optical circuit (b) shown in FIG. 6. The calculation result with respect to the optical circuit (a) is shown by a broken line, and the calculation result with respect to the optical circuit (b) is shown by a solid line. As can be understood from FIG. 7, the range of manufacture tolerance of the optical circuit (b) is wider than that of the optical circuit (a). Thus, according to the present embodiment, an optical circuit having a manufacture tolerance wider than that of a prior-art optical circuit can be realized.

Regarding the optical circuit (b) shown in FIG. 6, note that, in the case that the optical loss at the first optical coupler 604A is defined to be $\alpha_1$ [dB], the branching loss at the first optical coupler 604A is defined to be $\beta_1$ [dB], and the optical propagation loss of the optical waveguide 610 connecting the first optical coupler 604A and the second optical coupler 604B is defined to be γ [dB], the light inputted to the second optical coupler 604B is smaller than that of the first optical coupler 604A by $(\alpha_1+\beta_1+\gamma)$ [dB]. The light reflected by the second optical coupler 604B further loses $(\alpha_1+\beta_1+\gamma)$ [dB], during the path returning to the optical input channel of the first optical coupler 604. Usually, $\alpha_1$ is approximately 0.5 dB, $\beta_1$ is approximately 3 dB, and γ is approximately 0.5-10 dB. In this example, the reflected-light intensity ratio of the second optical coupler 604B is −34.5 dB; thus, the intensity of the reflected returning light generated at the second optical coupler 604B of the optical circuit (b) of the present embodiment is equal to or less than −42.5 dB with respect to the inputted light, at the light inputting point of the first optical coupler 604A. Thus, in the present embodiment, even if the condition regarding phases is a condition such that the reflected light from the first optical coupler 604A and the reflected light from the second optical coupler 604B enhance with each other, a required specification of reflected light intensity, such that it is equal to or less than −40 dB with respect to the intensity of the light inputted to the first optical coupler 604A, can be satisfied. In this manner, according to the present embodiment, a low-cost, low-reflection, and wide-manufacture-tolerance optical circuit can be realized without using expensive optical components such as an isolator and so on.

Figure 8:
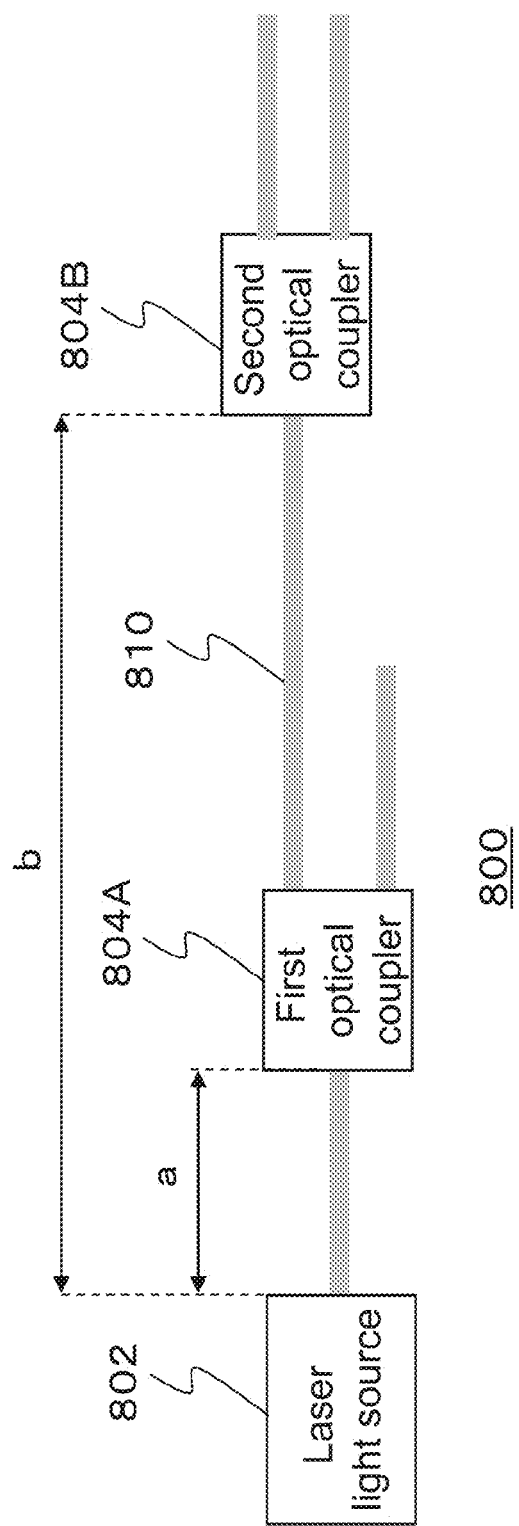
FIG. 8 is a schematic drawing of an example optical circuit according to an embodiment of the present invention.

FIG. 8 shows a schematic drawing of an example optical integrated circuit 800 of the present invention. The optical circuit 800 comprises a laser light source 802, a first coupler 804A, a second coupler 804B, and an optical waveguide 810. The first optical coupler and the second optical coupler are constructed to have the constructions explained above.

In the present embodiment, the optical integrated circuit 800 is constructed in such a manner that the optical length "a" between the laser light source 802 and the first coupler 804A satisfies the following formula:

[Formula 3]

$$a \leq \frac{\lambda^2}{2n_{eff}w} \qquad \text{(Equation 2)}$$

In the above Equation, λ is a wavelength of light in a vacuum, $n_{eff}$ is an effective refractive index of the waveguide that couples the laser light source 802 and the first optical coupler 804A, and w is spectral line width of the laser light source 802. By constructing the optical circuit 800 to satisfy Equation 2, effect of light reflected from the first optical coupler 804A can be further reduced because of the principles described below.

In general, noise due to returning light in the laser light source is generated, when an external resonator is formed between a laser resonator's end-surface and an external reflecting end, and the resonant wavelength of the external resonator coincides with the oscillation wavelength of the laser. The interval Δλ of the resonant wavelength of the external resonator formed between the laser light source 802 and the first optical coupler 804A can be represented by the following formula:

[Formula 4]

$$\Delta\lambda = \frac{\lambda^2}{2n_{eff}a}$$ (Equation 3)

In the case that the resonant wavelength interval Δλ is larger than the spectral line width w of the laser light source 802, i.e., in the case that Equation 2 stands, it is possible to avoid coincidence of the oscillation wavelength of the laser light source 802 and the resonant wavelength of the external resonator, if the oscillation wavelength of the laser light source 802 is appropriately selected. Thus, in the optical circuit 800 that satisfies Equation 2 according to the present embodiment, effect of the light reflected from the first optical coupler 804A can be reduced. Here, the spectral line width w of the laser light source 802 is an interval between two wavelengths, at each of which the intensity is one half of the maximum value. In the case that the laser light source 802 is oscillated in a multimode and, thus, there are four or more wavelengths, at each of which the intensity is one half of the maximum value, the spectral line width w is an interval between the shortest wavelength and the longest wavelength in the four or more wavelengths.

For example, in the case of an optical integrated circuit that is based on Si thin-line waveguides on an SOI substrate, if the values are set as λ=1.55 μm, $n_{eff}$=2.5, and w=3 nm, the optical length "a" between the laser source 802 and the first coupler 804A is set to be 160 μm or less for satisfying Equation 2. The above construction is substantially realizable in an optical integrated circuit that is based on Si thin-line waveguides.

In the present embodiment, it may be possible to construct the optical circuit 800 to satisfy Equation 1 at the same time as satisfying Equation 2. As a result thereof, effect of light reflected from the first optical coupler 804A becomes dominant and, at the same time, the effect can be further reduced. In this case, there may be a risk that effect of light reflected from the second optical coupler 804B becomes relatively large; however, the risk can be avoided by intentionally increasing the propagation loss γ (dB) of the optical waveguide 810.

Figure 9:
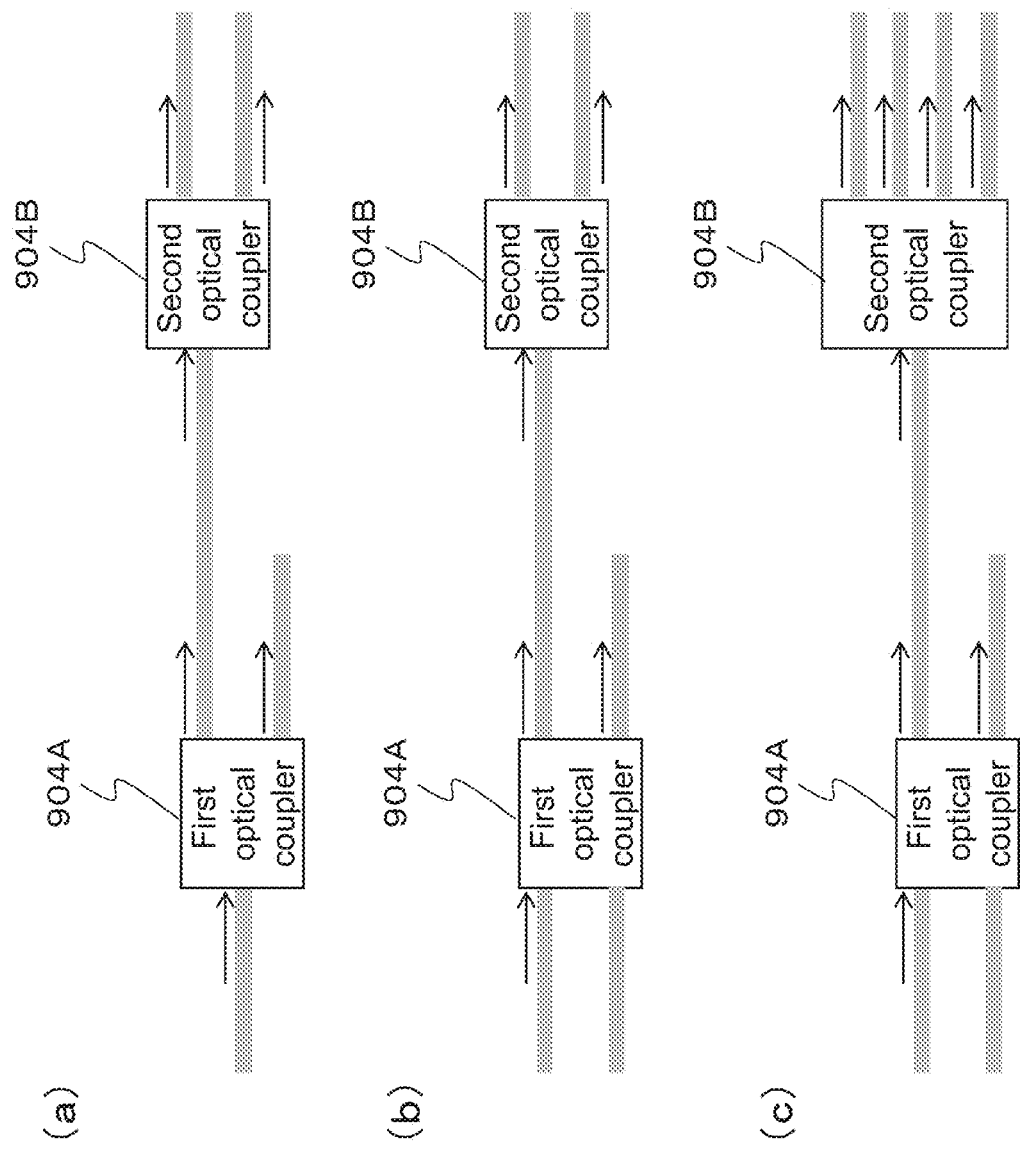
FIG. 9 is a schematic drawing of example optical circuits according to embodiments of the present invention.

FIG. 9(a) to (c) show schematic drawings of example optical circuits according to embodiments of the present invention. In FIG. 9(a), each of a first optical coupler 904A and a second optical coupler 904B comprises one input and two outputs. In FIG. 9(b), a first optical coupler 904A comprises two inputs and two outputs, and a second optical coupler 904B comprises one input and two outputs. In FIG. 9(c), a first optical coupler 904A comprises two inputs and two outputs, and a second optical coupler 904B comprises one input and four outputs. The constructions shown in FIG. 9 are mere examples. Each of the first optical coupler and the second optical coupler can comprises one of a variety of constructions, as necessary.

Figure 10:
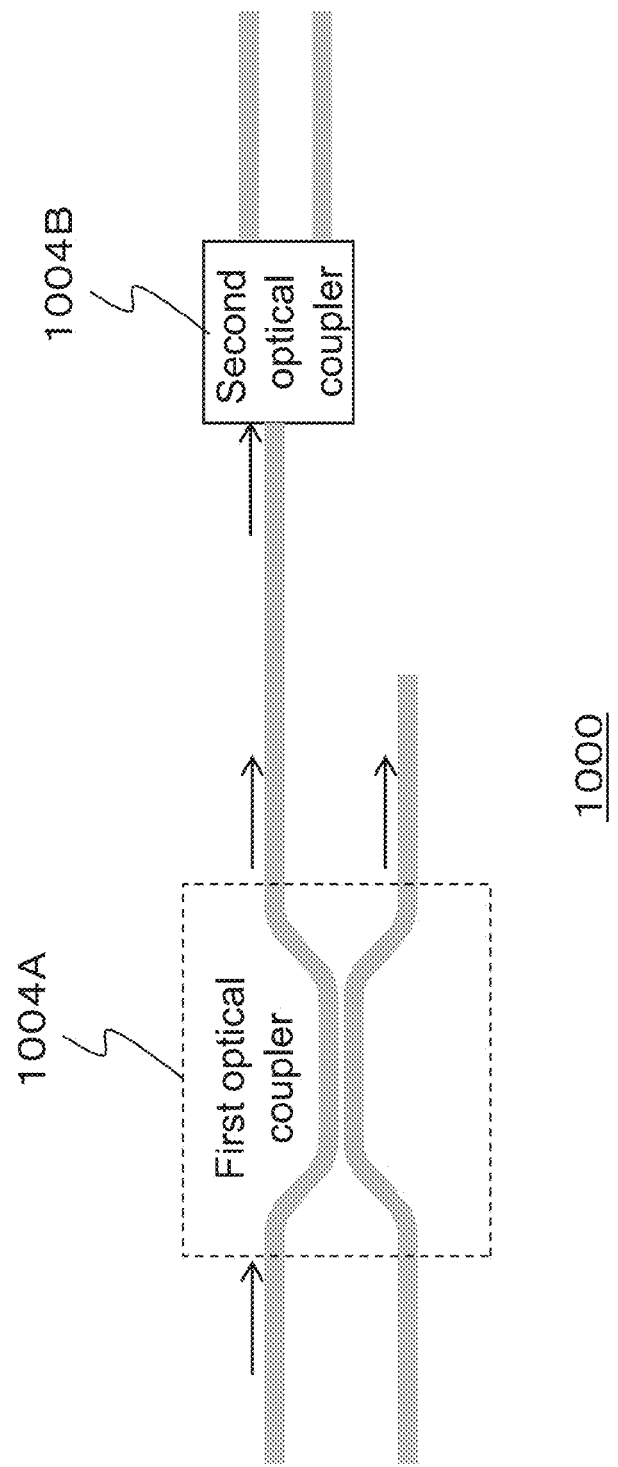
FIG. 10 is a schematic drawing of an example optical circuit according to an embodiment of the present invention.

FIG. 10 shows a schematic drawing of an example optical circuit 1000 according to an embodiment of the present invention. A first optical coupler 1004A is a directional coupler, and a second optical coupler 1004B is a multimode waveguide comprising one input and two outputs (such as an MMI coupler, a Y-branching part, or the like). The first optical coupler 1004A is constructed to have a reflected-light intensity ratio smaller than that of the second optical coupler 1004B. When compared with a multimode waveguide, such as an MMI coupler, a Y-branching part, or the like, it is easy to construct the directional coupler to have a low reflected-light intensity ratio. Thus, the optical circuit 1000 can be realized with low costs.

Figure 11:
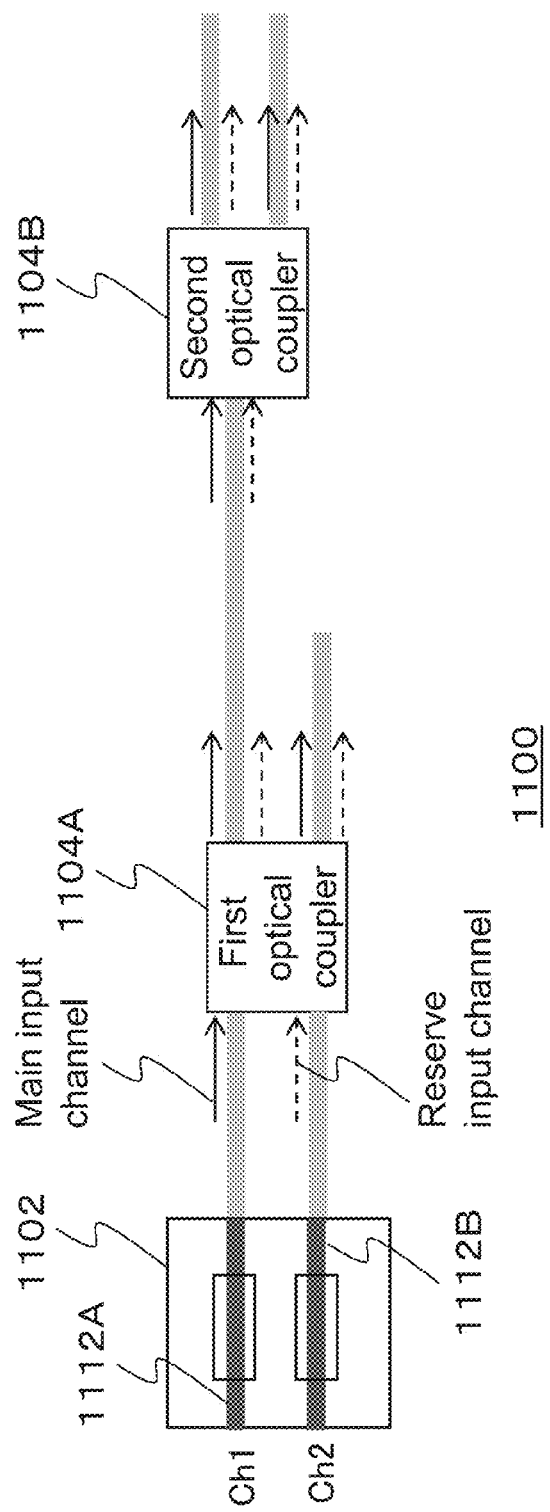
FIG. 11 is a schematic drawing of an example optical circuit according to an embodiment of the present invention.

FIG. 11 shows a schematic drawing of an example optical circuit 1100 according to an embodiment of the present invention. A first optical coupler 1104A comprises at least two inputs. The first optical coupler 1104A may comprise any number of outputs, and a second optical coupler 1104B may comprise any number of inputs and any number of outputs. In FIG. 11, at least one of the inputs of the first optical coupler 1104A is used as a main input channel, and at least another one of the inputs of the first optical coupler 1104A is used as a reserve input channel. The flow of light in the case that the main input channel is used is shown by arrows with solid lines, and the flow of light in the case that the reserve input channel is used is shown by arrows with broken lines.

The inputs of the first optical coupler 1104A are connected to the optical source 1102. The optical source 1102 may be constructed by use of one semiconductor laser chip. As shown in FIG. 11, one semiconductor laser chip may comprise plural laser channels Ch1 and Ch2. The laser channels may comprise driving electrodes 1112A and 1112B, respectively. The first laser channel Ch1 and the second laser channel Ch2 are connected to the inputs of the first optical coupler 1104A, respectively.

Under the normal operation, the main input channel can be used by supplying electric power to the driving electrode 1112A of the laser channel Ch1 that is connected to the main input channel. In the case that a failure has occurred in the main input channel, electric power is supplied to the driving electrode 1112B of the laser channel Ch2 that is connected to the reserve input channel, instead of supplying electric power to the laser channel Ch1. As a result thereof, the main input channel and the reserve input channel can be switched therebetween.

The light source 1102 may comprise plural semiconductor laser (an LD, a SLD, etc.) chips; and each of the plural semiconductor laser chips may be connected to each of the inputs of the first optical coupler.

According to the present embodiment, even if the required specification regarding reflected light from the first optical coupler 1104A and the second optical coupler 1104B is not satisfied due to manufacture errors when the main input channel of the first optical coupler 1104A is used in a quality inspection of the optical circuit 1100, the optical integrated circuit can be used without replacing it, if the required specification regarding reflected light from the first optical coupler 1104A and the second optical coupler 1104B is satisfied when the reserve-input optical channel is used.

In the present embodiment, the reserve-input optical channel of the first optical coupler 1104A may be designed and constructed to have a small reflected-light intensity ratio compared with that of the main input channel.

Figure 12:
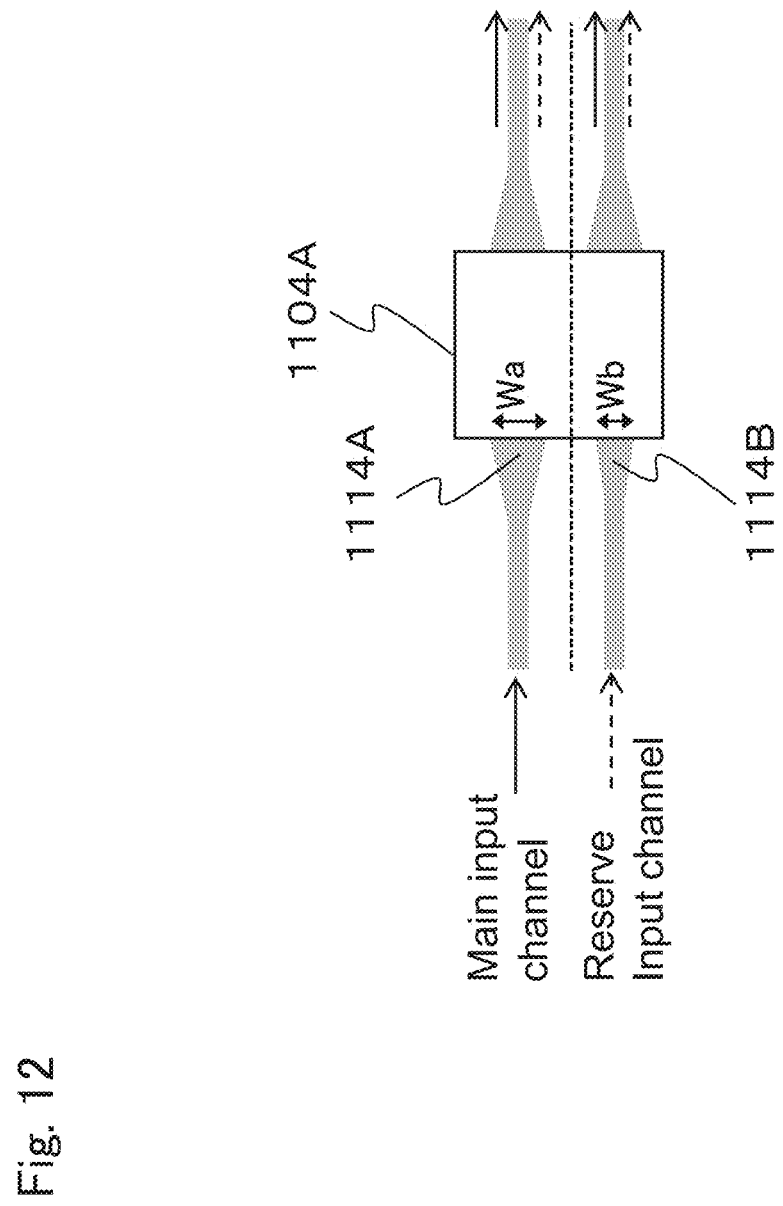
FIG. 12 is a drawing showing an example construction of an optical coupler used in an optical circuit according to an embodiment of the present invention.

The first optical coupler 1104A may be constructed to have a shape that is asymmetric with respect to a center line thereof. As shown in FIG. 12, the first optical coupler 1104A may be constructed to have a shape that is asymmetric with respect to a center line between the first input part 1114A and the second input part 1114B. It may be constructed in such a manner that the first optical coupler 1104A comprises an MMI coupler, and taper width Wa of the first input part 1114A is larger than taper width Wb of the second input part 1114B. In such a case, the first input and the second input may be used as the main input channel and the reserve input channel, respectively. In the case that a normal operation cannot be carried out by use of the main input channel, the reserve input channel may be used.

According to the present embodiment, by designing the taper width Wb to be smaller than the taper width Wa, the reserve input channel of the first optical coupler 1104A can be designed to have a small reflected-light intensity ratio compared with that of the main-input optical channel. Thus, even if the reflected-light intensity ratio in the main input channel has deviated from a desired value due to manufacture errors and so on, the reserve input channel, that has characteristics better than those of the main input channel, can be used. Thus, destabilizing of the operation of the light source 1102 due to reflected light can be prevented. Note that, in the present embodiment, returning of the reflected light generated at the output end of the first optical coupler 1104A to the second input part 1114B is prevented by reducing the taper width Wb; thus, there is effect such that the reflected light is reduced when the reserve input channel is used. However, since the first optical coupler 1104A is designed in such a manner that the optical loss becomes minimum when the main input channel is used, it should be reminded that, when the reserve input channel is used, the optical loss will be increased in exchange for reduction of the reflected-light intensity ratio.

The optical circuits according to the embodiments of the present invention can be constructed as optical integrated circuits. Although the present invention has explained with reference to specific embodiments, it is intended that the embodiments described in this specification are not used to interpret the present invention in a limiting way, and that the embodiments described in this specification are used as examples to explain the present invention. It is obvious for a person skilled in the art that other alternative embodiments can be implemented without departing from the scope of the present invention.

The invention claimed is:

1. An optical circuit comprising:
   a first optical coupler comprising at least a first input and at least two outputs; and
   a second optical coupler comprising an input coupled to one of the outputs of the first optical coupler;
   wherein a ratio of intensity of light reflected from the first input of the first optical coupler to intensity of light inputted to the first input of the first optical coupler is smaller than a ratio of intensity of light reflected from the input of the second optical coupler to intensity of light inputted to the input of the second optical coupler, and
   wherein the first optical coupler is an MMI coupler, the first input and the second input have tapered shapes, and width of the taper of the input used as the main input is larger than width of the taper of the input used as the reserve input.

2. The optical circuit according to claim 1, wherein the first optical coupler and the second optical coupler are coupled via an optical waveguide, and the ratio $R_1$ of the intensity of the light reflected from the first input of the first optical coupler to the intensity of the light inputted to the first input of the first optical coupler, optical loss $\alpha_1$ of the first optical coupler, branching loss $\beta_1$ of the first optical coupler, the ratio $R_2$ of the intensity of the light reflected from the input of the second optical coupler to the intensity of the light inputted to the input of the second optical coupler, and propagation loss $\gamma$ of the optical waveguide satisfy the following relationship:

$$(R_2 - R_1) \leq 2(\alpha_1 + \beta_1 + \gamma).$$

3. The optical circuit according to claim 1, wherein the first optical coupler and the second optical coupler are MMI couplers.

4. The optical circuit according to claim 3, wherein the width of the MMI coupler that constitutes the first optical coupler is smaller than the width of the MMI coupler that constitutes the second optical coupler.

5. The optical circuit according to claim 1, wherein the second optical coupler comprises plural outputs.

6. An optical circuit comprising:
   a first optical coupler comprising at least a first input and at least two outputs;
   a second optical coupler comprising an input coupled to one of the outputs of the first optical coupler; and
   a laser light source coupled to the first input of the first optical coupler,
   wherein a ratio of intensity of light reflected from the first input of the first optical coupler to intensity of light inputted to the first input of the first optical coupler is smaller than a ratio of intensity of light reflected from the input of the second optical coupler to intensity of light inputted to the input of the second optical coupler,
   wherein the first optical coupler is an MMI coupler, the first input and the second input have tapered shapes, and width of the taper of the input used as the main input is larger than width of the taper of the input used as the reserve input, and
   wherein optical path length "a" between the laser light source and the first optical coupler satisfies the following relationship:

$$a \leq \frac{\lambda^2}{2n_{\text{eff}} w}$$

wherein "λ" is a wavelength of light in a vacuum, "$n_{\text{eff}}$" is an effective refractive index of the waveguide that couples the laser light source and the first optical coupler, and "w" is spectral line width of the laser light source.

7. The optical circuit according to claim 1, further comprising:
   a laser light source coupled to the first input of the first optical coupler,
   wherein the light source comprises at least a first laser channel and a second laser channel, the first optical coupler comprises at least the first input and a second input, the first laser channel and the second laser channel are coupled to the first input and the second input, respectively, and one of the first input and the second input is used as a main input and the other is used as a reserve input.

8. The optical circuit according to claim 7, wherein the shape of the first optical coupler is asymmetric with respect to a center line between the first input and the second input.

9. An optical circuit comprising:
   a first optical coupler comprising at least two outputs;
   a second optical coupler coupled to at least one of the outputs of the first optical coupler; and
   a laser light source coupled to an input of the first optical coupler, wherein a ratio of intensity of light reflected from the first optical coupler to intensity of light inputted to the first optical coupler is smaller than a ratio of intensity of light reflected from the second optical coupler to intensity of light inputted to the second optical coupler, wherein the light source comprises at least a first laser channel and a second laser channel, the first optical coupler comprises at least a first input and a second input, the first laser channel and the second laser channel are coupled to the first input and the second input, respectively, and one of the first input and the second input is used as a main input and the other is used as a reserve input, wherein the first optical coupler is an MMI coupler, the first input and the second input have tapered shapes, and width of the taper of the input used as the main input is larger than width of the taper of the input used as the reserve input.

10. The optical circuit according to claim 1, wherein the first optical coupler is a directional coupler.

* * * * *